(12) United States Patent
Kim et al.

(10) Patent No.: US 9,551,442 B2
(45) Date of Patent: Jan. 24, 2017

(54) VEHICLE PLASTIC INTERCOOLER PIPE WITH LOW VIBRATION CHARACTERISTICS

(71) Applicants: Hyundai Motor Company, Seoul (KR); Kia Motors Corporation, Seoul (KR)

(72) Inventors: Gi-Hwan Kim, Yongin-shi (KR); Chi-Hoon Choi, Suwon-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/447,182

(22) Filed: Jul. 30, 2014

(65) Prior Publication Data

US 2015/0059906 A1 Mar. 5, 2015

(30) Foreign Application Priority Data

Aug. 29, 2013 (KR) .................. 10-2013-0103377

(51) Int. Cl.
*F16L 11/18* (2006.01)
*F16L 11/118* (2006.01)
*F16L 11/04* (2006.01)
*F02M 35/10* (2006.01)
*F02M 35/12* (2006.01)
*F16L 9/00* (2006.01)
*F16L 11/14* (2006.01)
*F16L 55/04* (2006.01)

(52) U.S. Cl.
CPC ....... *F16L 11/118* (2013.01); *F02M 35/10137* (2013.01); *F02M 35/10321* (2013.01); *F02M 35/1277* (2013.01); *F16L 9/006* (2013.01); *F16L 11/04* (2013.01); *F16L 11/14* (2013.01); *F16L 55/041* (2013.01)

(58) Field of Classification Search
USPC .............................. 138/119, 121; 428/36.92
See application file for complete search history.

(56) References Cited

U.S. PATENT DOCUMENTS 2,012,766 A * 8/1935 Meyer .................... B21D 15/06
138/121
2,779,976 A * 2/1957 Roberts .................. B29C 49/20
138/122

(Continued)

FOREIGN PATENT DOCUMENTS

JP 6-8384 Y2 3/1994

*Primary Examiner* — James Hook
(74) *Attorney, Agent, or Firm* — Morgan, Lewis & Bockius LLP (57) ABSTRACT

An intercooler pipe for a vehicle may include an inlet which is positioned at an upper portion of the intercooler pipe; an upper bellows portion which forms an upper bellows body that protrudes in a rib shape from a surface of a pipe body extended in a direction toward the inlet; an outlet which is positioned at a lower portion of the intercooler pipe; a lower bellows portion which forms a lower bellows body that protrudes in a rib shape from a surface of the pipe body extended in a direction toward the outlet; and an intermediate portion which has the pipe body bent downward from the upper bellows portion and connected to the lower bellows portion, wherein a thickness of the pipe body of the intermediate portion is greater than a thickness of the upper bellows body and a thickness of the lower bellows body.

2 Claims, 6 Drawing Sheets

(56) References Cited

U.S. PATENT DOCUMENTS

| | | | | |
|---|---|---|---|---|
| 3,838,713 A * | 10/1974 | Tubbs | F16L 11/111 | 138/109 |
| 4,165,110 A * | 8/1979 | Itzler | F16L 27/11 | 138/121 |
| 4,659,531 A * | 4/1987 | Ezaki | B29C 47/0023 | 264/512 |
| 4,662,404 A * | 5/1987 | LeVeen | A61M 39/08 | 138/118 |
| 5,305,799 A * | 4/1994 | Dal Palu | F16L 11/11 | 138/109 |
| 5,476,080 A * | 12/1995 | Brunnhofer | B60K 15/01 | 123/198 D |
| 5,635,675 A * | 6/1997 | Houga | F16L 7/00 | 138/120 |
| 5,699,835 A * | 12/1997 | Nakagawa | F16L 9/133 | 138/141 |
| 5,704,401 A * | 1/1998 | Fukui | F16L 11/11 | 138/119 |
| 5,792,532 A * | 8/1998 | Pfleger | F16L 11/118 | 138/121 |
| 6,056,018 A * | 5/2000 | Renaud | F16L 11/111 | 138/121 |
| 6,062,266 A | 5/2000 | Burkhardt | | |
| 6,119,731 A * | 9/2000 | Nakagawa | B29C 49/04 | 138/121 |
| 6,523,576 B2 * | 2/2003 | Imaeda | F02M 37/0017 | 138/121 |
| 6,622,756 B2 * | 9/2003 | Berninger | H02G 3/0468 | 138/109 |
| 6,695,705 B2 | 2/2004 | Stervik | | |
| 2001/0007832 A1 * | 7/2001 | Takabe | C10M 169/00 | 464/15 |
| 2002/0017331 A1 * | 2/2002 | Renaud | B60H 1/00557 | 138/121 |
| 2002/0062873 A1 * | 5/2002 | Nakagawa | F02M 35/10137 | 138/122 |
| 2007/0012374 A1 * | 1/2007 | Yasuda | F16L 11/11 | 138/121 |
| 2007/0267012 A1 * | 11/2007 | McCarthy | B29C 45/0013 | 128/201.11 |
| 2009/0308479 A1 * | 12/2009 | Krauss | F16L 11/11 | 138/118 |
| 2010/0024120 A1 * | 2/2010 | Coronado | E03C 1/20 | 4/679 |
| 2013/0320590 A1 * | 12/2013 | Szekely | B29C 67/00 | 264/294 |
| 2016/0069059 A1 * | 3/2016 | Webel | E03C 1/284 | 4/421 |

* cited by examiner

VEHICLE PLASTIC INTERCOOLER PIPE WITH LOW VIBRATION CHARACTERISTICS

CROSS-REFERENCE TO RELATED APPLICATIONS

The present application claims priority of Korean Patent Application No. 10-2013-0103377 filed on Aug. 29, 2013, the entire contents of which application is incorporated herein for all purposes by this reference.

BACKGROUND OF THE INVENTION

Field of the Invention

The present disclosure relates to an intercooler pipe for a vehicle, and more particularly, to an intercooler pipe for a vehicle with a configuration of different thickness and materials of the intercooler pipe used for each section to prevent vibration of a throttle body from transmitting to an intercooler and a side member of a vehicle body through the intercooler pipe.

Description of Related Art

In general, an intercooler pipe for a vehicle refers to a pipe that connects an intercooler and a throttle body, and serves as a flow path where air cooled by the intercooler flows through to the throttle body.

Figure 1:
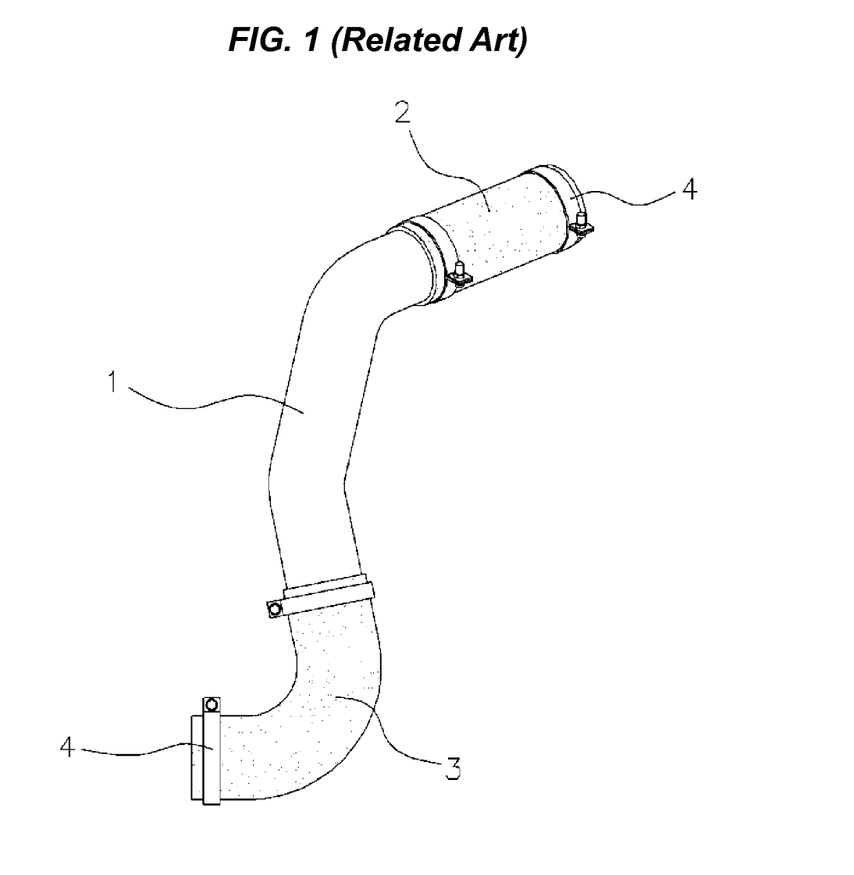
FIG. 1 is a perspective view of an intercooler pipe of the related art.

FIG. 1 illustrates a structure of an intercooler pipe for a vehicle in the related art.

The intercooler pipe for a vehicle in the related art has a configuration in which an inlet side rubber pipe 2 is installed to an inlet of a pipe body 1 made of an aluminum material, and an outlet side rubber pipe 3 is also installed to an outlet of the pipe body 1, and the rubber pipes 2 and 3 are fixed by clamps 4.

However, because the aforementioned intercooler pipe for a vehicle in the related art uses the pipe body made of an aluminum material and the rubber pipes, there are drawbacks of costs increasing and weight of the intercooler pip also rising.

Therefore, in order to reduce cost and the weight of the intercooler pipe, an intercooler pipe entirely made out of a plastic material using a thermoplastic ether ester elastic (TEEE) polymer has been introduced in the related art.

However, the difficulty of applying the intercooler pipe made out of the plastic material to the vehicle remains due to deterioration in vibration and noises, in comparison with the intercooler pipe of the related art, which is illustrated in FIG. 1.

The reason why the intercooler pipe made out of the plastic material is vulnerable to vibration and noises is because the vibration transmitted from an engine is transmitted to the intercooler through the intercooler pipe, and the vibration transmitted to the intercooler causes a side member of the vehicle body to vibrate, which consequently causes vibration and noises in an interior of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a configuration of an intercooler pipe for a vehicle with low vibration characteristics, the entirety of which is made of a plastic material and may achieve an equal or better level of performance in comparison with an intercooler pipe of the related art.

In an aspect of the present invention, an intercooler pipe for a vehicle may include an inlet which is positioned at an upper portion of the intercooler pipe, an upper bellows portion which forms an upper bellows body that protrudes in a rib shape from a surface of a pipe body extended in a direction toward the inlet, an outlet which is positioned at a lower portion of the intercooler pipe, a lower bellows portion which forms a lower bellows body that protrudes in a rib shape from a surface of the pipe body extended in a direction toward the outlet, and an intermediate portion which may have the pipe body bent downward from the upper bellows portion and connected to the lower bellows portion, wherein a thickness of the pipe body of the intermediate portion is greater than a thickness of the upper bellows body of the upper bellows portion and a thickness of the lower bellows body of the lower bellows portion.

A stiffness of the upper bellows portion and the lower bellows portion is lower than a stiffness of the intermediate portion.

The upper bellows portion and the lower bellows portion are made of a soft synthetic resin, and the intermediate portion is made of a hard synthetic resin.

The soft synthetic resin of the upper bellows portion and the lower bellows portion is a polyester (PET) based synthetic resin, and the hard synthetic resin of the intermediate portion is a polybutylene terephthalate (PBT) based synthetic resin.

The soft synthetic resin of the upper bellows portion and the lower bellows portion is a thermoplastic polyester elastomer (TPC-ET) synthetic resin including a dicarboxylate-diol polymer and a glycol polymer.

The hard synthetic resin for the intermediate portion is a thermoplastic polyester synthetic resin that is polybutylene terephthalate (PBT).

The intercooler pipe for a vehicle in an exemplary embodiment of the present invention, with low vibration characteristics and aforementioned configuration, has different thicknesses and materials applied to the upper bellows portion, the lower bellows portion and the intermediate portion so that vibration transmitted from a throttle body is attenuated by both a mass impedance mismatch and a stiffness impedance mismatch effect, thereby obtaining the effect of reducing vehicle noises.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
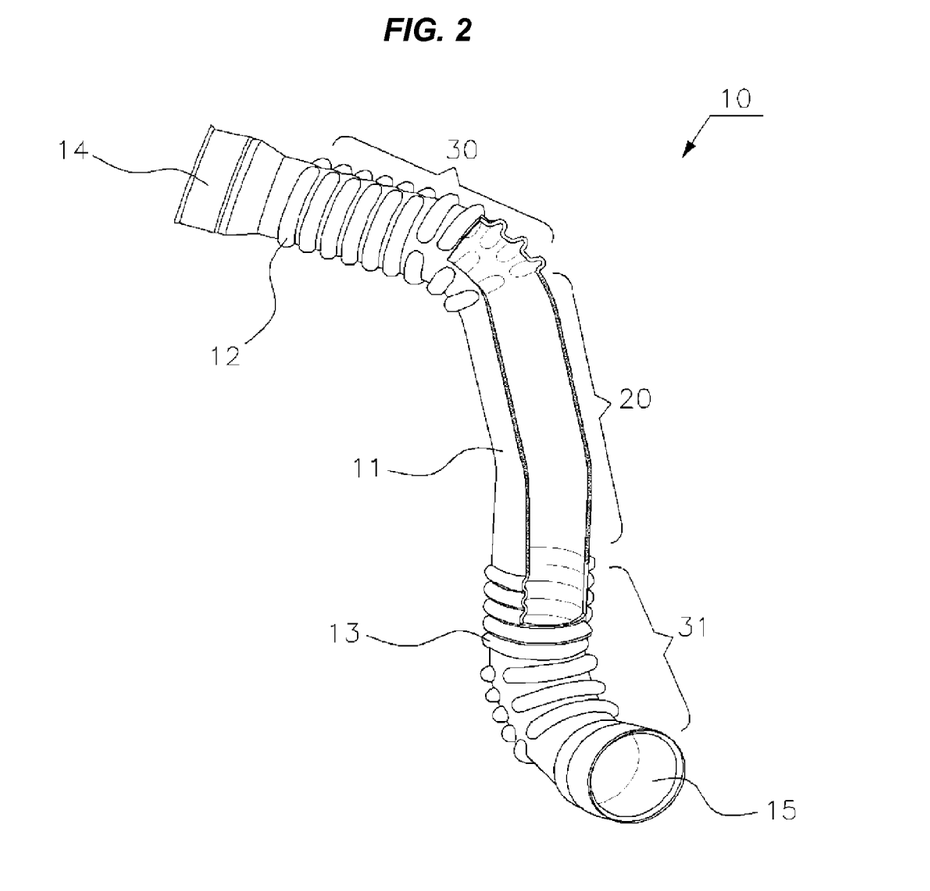
FIG. 2 is a partially cut-out perspective view of an intercooler pipe in an exemplary embodiment of the present invention.
Figure 3:
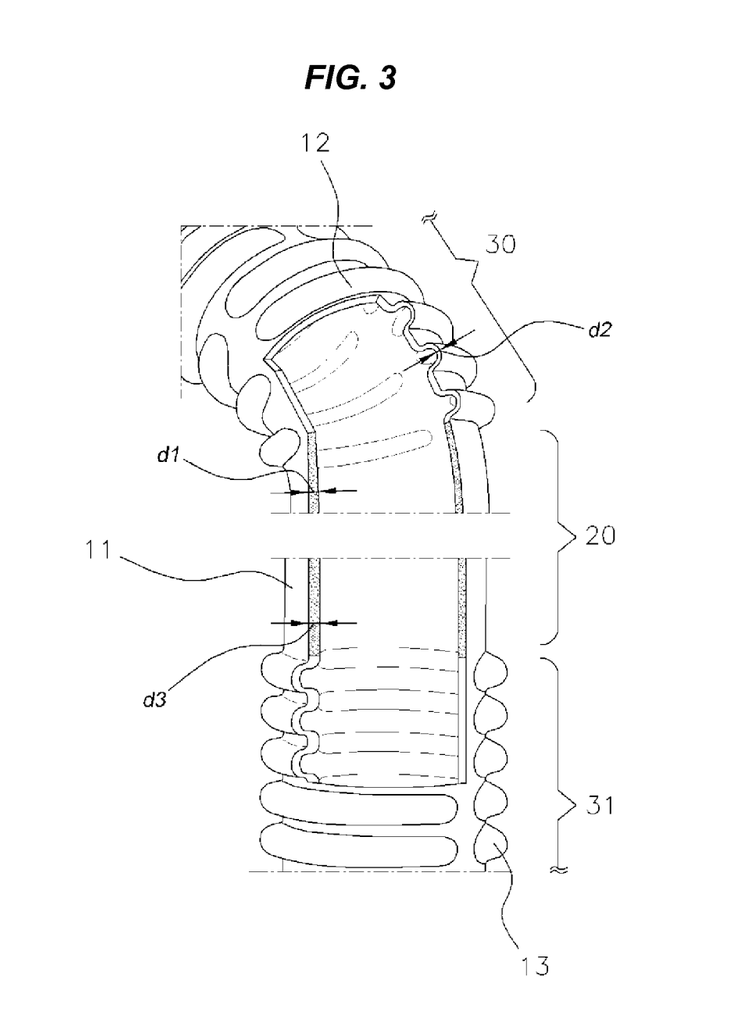
FIG. 3 is a partially cut-out perspective view illustrating an enlarged main part of the intercooler pipe in an exemplary embodiment of the present invention.

FIG. 2 is a configuration view of an intercooler pipe for a vehicle in an exemplary embodiment of the present invention, which has low vibration characteristics, and FIG. 3 is a partially cut-out perspective view illustrating an enlarged main part of the intercooler pipe in an exemplary embodiment of the present invention.

An intercooler pipe 10 for a vehicle in an exemplary embodiment of the present invention has a configuration where the thickness and the material for the intercooler pipe are different in each section to prevent vibration of a throttle body from transmitting to an intercooler and a side member of the vehicle body through the intercooler pipe.

As illustrated in FIG. 2, the intercooler pipe 10 in an exemplary embodiment of the present invention includes an inlet 14, which is positioned at an upper portion of the intercooler pipe, an upper bellows portion 30, which forms an upper bellows body 12 that protrudes in a rib shape from a surface of a pipe body 11 extended in a direction toward the inlet 14, an outlet 15, which is positioned at a lower portion of the intercooler pipe, a lower bellows portion 31, which forms a lower bellows body 13 that protrudes in a rib shape from a surface of the pipe body 11 extended in a direction toward the outlet 15, and an intermediate portion 20, which has the pipe body 11 bent downward from the upper bellows portion 30 and is connected to the lower bellows portion 31.

As described above, vibration transmitted by an intercooler pipe made out of a plastic material determined by impedance characteristics of a medium. That is, when a shape of the medium, which transmits vibration, is uniform, or when the medium is made out of the same material, the medium can easily transmit vibration because the variation amount of impedance is small in such cases.

Here, the variation amount of impedance of the medium is associated with mass, stiffness, and damping of the medium.

Specifically, in the medium, as the variation amounts of mass, stiffness, and damping are increased between a vibration excitation point, which applies vibration, and a vibration receiving point, which receives vibration, the variation amount of impedance of the medium between the vibration excitation point and the vibration receiving point is increased. When increased, there is impedance mismatch between the vibration excitation point and the vibration receiving point, and as the degree of impedance mismatch is increased, the vibration that is transmitted through the medium is reduced due to a reflected wave of vibration.

In order to apply this inconsistent characteristic of impedance to the intercooler pipe in an exemplary embodiment of the present invention, the present invention suggests a structure with mass impedance mismatch, where the thickness of the pipe body of the intercooler pipe is varied for each section.

More specifically, as illustrated in FIG. 3, a thickness d1 of the pipe body 11 of the intermediate portion 20 is greater than a thickness d2 of the upper bellows body 12 of the upper bellows portion 30 and a thickness d3 of the lower bellows body 13 of the lower bellows portion 31, so that the mass of the intermediate portion 20 is larger than the masses of the upper bellows portion 30 and the lower bellows portion 31.

Accordingly, the masses of the upper bellows portion 30 and the lower bellows portion 31 are different for the purpose of producing mass impedance mismatch between the upper bellows portion 30 and the intermediate portion 20, and between the intermediate portion 20 and the lower bellows portion 31, respectively. Therefore, the vibration transmitted through the intercooler pipe is reduced as a result of a progressive wave between the vibration excitation point and the vibration receiving point being reflected.

In the exemplary embodiment of the present invention, the thicknesses d2 and d3 of the upper bellows body 12 and the lower bellows body 13 were set to be 1.3 mm, respectively, and the thickness d1 of the pipe body 11 of the intermediate portion 20 was set to be 5 mm.

In the intercooler pipe in an exemplary embodiment of the present invention, a structure with stiffness impedance mismatch is applied by using materials with different stiffness for each section of the intercooler pipe to further increase the impedance inconsistency effect, and different types of synthetic resin materials with a great difference in storage modulus for each section of the intercooler pipe are adopted.

In particular, the upper bellows portion 30 and the lower bellows portion 31 are made from a soft synthetic resin, and the intermediate portion 20 is made from a hard synthetic resin to provide differences in storage modulus between the upper bellows portion 30 and the intermediate portion 20, and between the intermediate portion 20 and the lower bellows portion 31, which results in a stiffness impedance mismatch effect.

In the exemplary embodiment of the present invention, the upper bellows portion 30 and the lower bellows portion 31 were made of a polyester (PET) based synthetic resin, a soft material, and the intermediate portion 20, a polybutylene terephthalate (PBT) based synthetic resin, which is a hard material. More specifically, the soft material used for the upper bellows portion 30 and the lower bellows portion 31 was a thermoplastic polyester elastomer (TPC-ET) synthetic resin including a dicarboxylate-diol polymer and a glycol polymer, and a hard material used for the intermediate portion 20 was a thermoplastic polyester synthetic resin, is polybutylene terephthalate (PBT). In this case, the polyester based synthetic resin, which is the material of the upper bellows portion 30 and the lower bellows portion 31, has a storage modulus eight times larger than that of the polybutylene terephthalate (PBT) based synthetic resin, which is the material of the intermediate portion 20, so that the stiffness impedance mismatch of the intercooler pipe in an exemplary embodiment of the present invention may occur effectively.

Meanwhile, in order to apply different thicknesses and different materials to the upper bellows portion 30, the lower bellows portion 31, and the intermediate portion 20 as described above, a sequential co-extrusion (SeCo) method that simultaneously processes the soft portion of the upper bellows portion 30, the hard portion of the intermediate portion 20, and the soft portion of the lower bellows portion 31 along a longitudinal direction of the intercooler pipe is used, which is done by using different types of materials and applying a 3D blow molding method.

Figure 4:
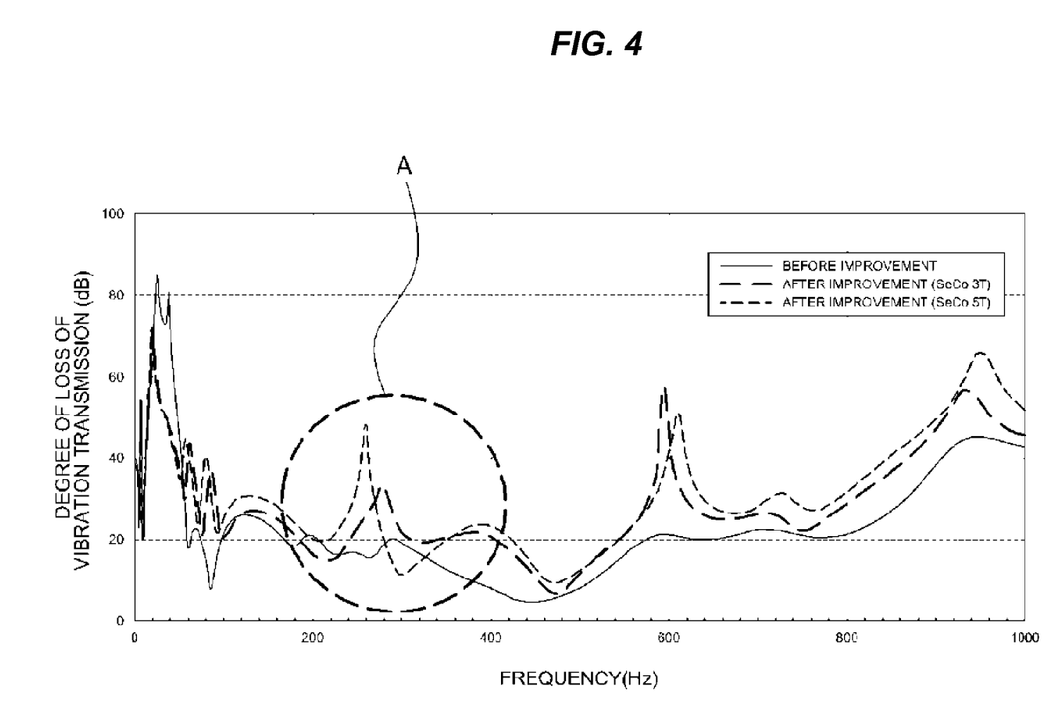
FIG. 4 is a graph illustrating degrees of loss of vibration transmission of the intercooler pipe in an exemplary embodiment of the present invention in accordance with frequency.
Figure 5:
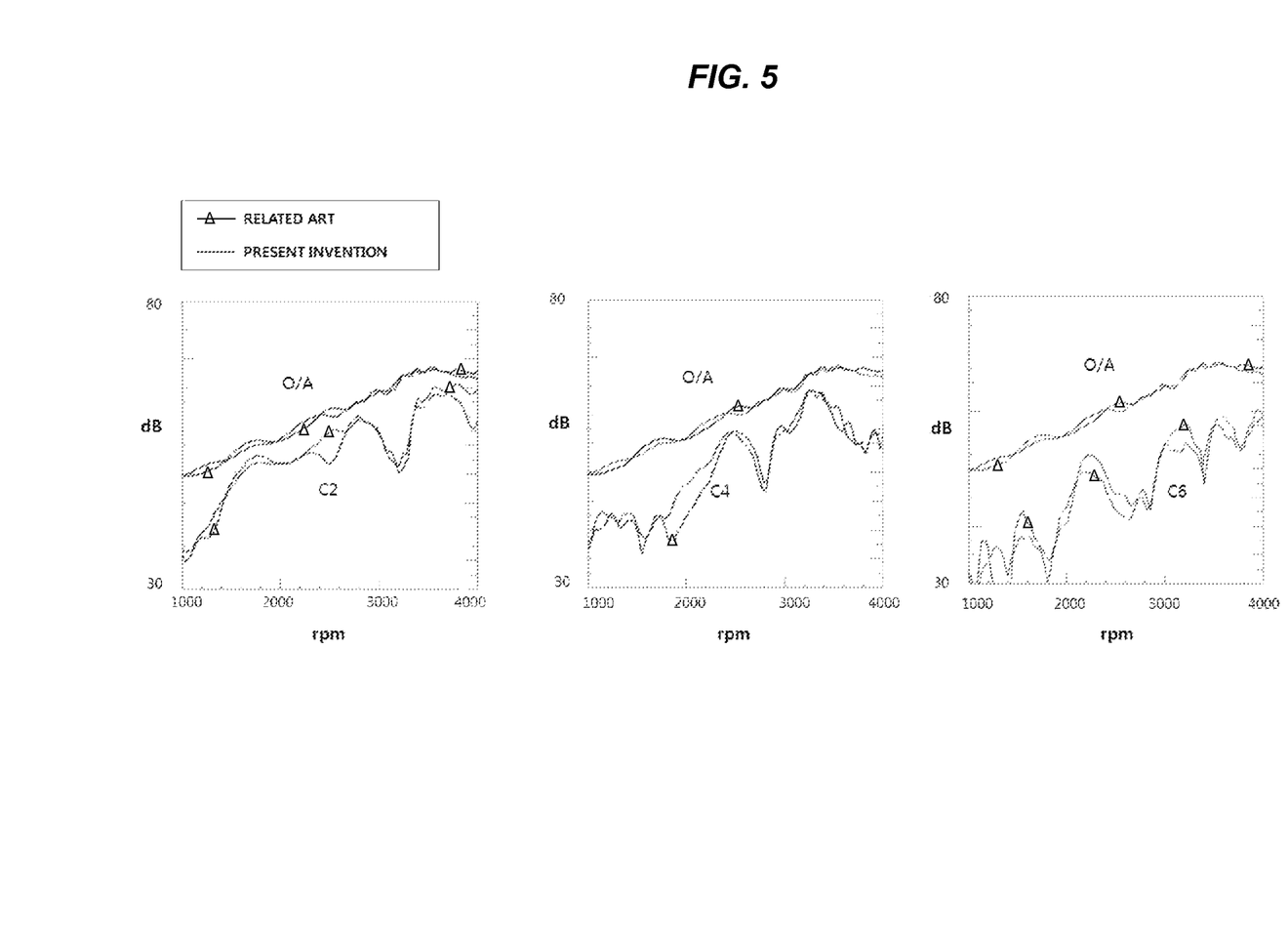
FIGS. 5 and 6 are graphs illustrating noise levels of the intercooler pipe in an exemplary embodiment of the present invention in accordance with revolutions per minute of an engine.
Figure 6:
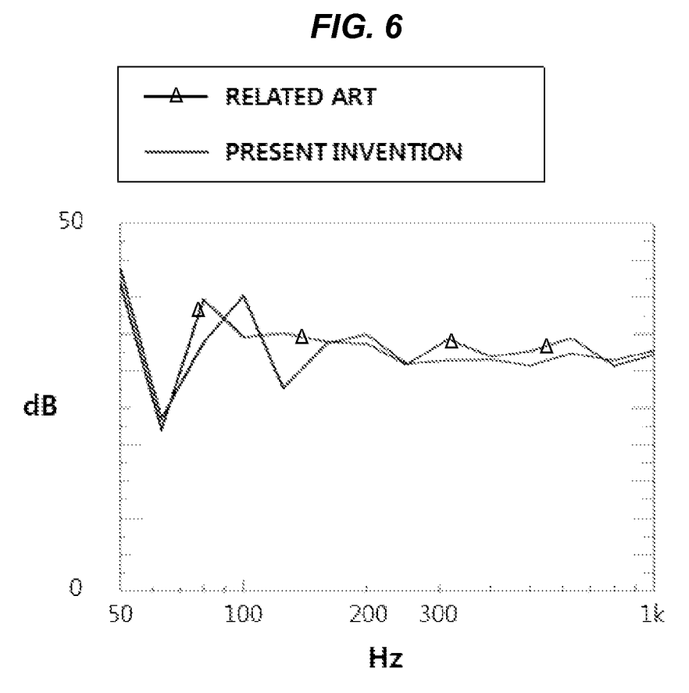

In order to test vibration reducing performance of the intercooler pipe in an exemplary embodiment of the present invention, the degree of vibration transmission loss as illustrated in a graph of FIG. 4 and noise levels as illustrated in graphs of FIGS. 5 and 6 were tested.

FIG. 4 is a graph illustrating the degree of vibration transmission loss of the intercooler pipe in an exemplary embodiment of the present invention in accordance with frequency, and FIGS. 5 and 6 are graphs illustrating noise levels of the intercooler pipe in an exemplary embodiment of the present invention in accordance with revolutions per minute of an engine.

First, regarding the intercooler pipe in an exemplary embodiment of the present invention, the degree of vibration transmission loss was tested between the throttle body, which is the vibration excitation point, and the intercooler, which is the vibration receiving point.

The test results show that when the thickness d1 of the intermediate portion 20 is 3 mm, in a region of 200 to 450 Hz, which is a target frequency region A, the degree of vibration transmission loss was measured greater in comparison with the intercooler pipe of the related art, as illustrated in FIG. 1, and when the thickness d1 of the intermediate portion 20 is 5 mm, in a region of 200 to 450 Hz, which is the target frequency region A, the degree of vibration transmission loss was measured greater in comparison with a case where the thickness d1 of the intermediate portion 20 is 3 mm. Therefore, it was confirmed that an effect of vibration and noise reductions, when the vehicle is running, was sufficiently implemented. Here, the great degree of vibration transmission loss means a large reduction in vibration.

In order to test an effect of noise reduction as a result of the reduction in vibration, driving noises that occur when the vehicle accelerates and noises that occur when the vehicle is idling were evaluated after mounting a microphone at a position near the level of a driver's ears. As illustrated in FIG. 5, the result of testing the driving noises that occur when the vehicle accelerates indicates that the intercooler pipe in an exemplary embodiment of the present invention shows a noise level generally equivalent to that of the intercooler pipe of the related art illustrated in FIG. 1, and particularly, the result shows an effect in which the noises are further reduced in a region where frequency is 200 Hz or higher in comparison with the intercooler pipe of the related art.

As illustrated in FIG. 6, as a result of testing noises that occur when the vehicle is idle, a booming frequency was moved in a region of 100 Hz in comparison with the intercooler pipe of the related art illustrated in FIG. 1, but an overall level of the noises that occur when the vehicle is idle was equivalent to the noise level of the related art.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intercooler pipe for a vehicle comprising:
an inlet positioned at an upper portion of the intercooler pipe;
an upper bellows portion forming an upper bellows body protruding in a rib shape from a surface of a pipe body extended in a direction toward the inlet;
an outlet positioned at a lower portion of the intercooler pipe;
a lower bellows portion forming a lower bellows body protruding in a rib shape from a surface of the pipe body extended in a direction toward the outlet; and
an intermediate portion having the pipe body bent downward from the upper bellows portion and connected to the lower bellows portion,
wherein a thickness of the pipe body of the intermediate portion is greater than both a thickness of the upper bellows body of the upper bellows portion and a thickness of the lower bellows body of the lower bellows portion, wherein variation amounts of mass are generated between the inlet as a vibration excitation point and the outlet as a vibration receiving point,
wherein the upper bellows portion and the lower bellows portion are made of a polyester (PET), and the intermediate portion is made of a polybutylene terephthalate (PBT), whereby variation amounts of stiffness are generated between the inlet as the vibration excitation point and the outlet as the vibration receiving point; and
wherein variation amounts of impedance between the inlet and the outlet is increased by the variation amounts of mass and the variation amounts of stiffness, whereby progressive waves through the intercooler pipe are reflected and then vibration transmitted through the intercooler pipe is reduced.

2. An intercooler pipe for a vehicle comprising:
an inlet positioned at an upper portion of the intercooler pipe;
an upper bellows portion forming an upper bellows body protruding in a rib shape from a surface of a pipe body extended in a direction toward the inlet;
an outlet positioned at a lower portion of the intercooler pipe;

a lower bellows portion forming a lower bellows body protruding in a rib shape from a surface of the pipe body extended in a direction toward the outlet; and an intermediate portion having the pipe body bent downward from the upper bellows portion and connected to the lower bellows portion, wherein a thickness of the pipe body of the intermediate portion is greater than both a thickness of the upper bellows body of the upper bellows portion and a thickness of the lower bellows body of the lower bellows portion, wherein variation amounts of mass are generated between the inlet as a vibration excitation point and the outlet as a vibration receiving point, wherein the upper bellows portion and the lower bellows portion are made of a thermoplastic polyester elastomer (TPC-ET) synthetic resin including a dicarboxylate-diol polymer and a glycol polymer, and the intermediate portion is made of a polybutylene terephthalate (PBT), whereby variation amounts of stiffness are generated between the inlet as the vibration excitation point and the outlet as the vibration receiving point; and wherein variation amounts of impedance between the inlet and the outlet is increased by the variation amounts of mass and the variation amounts of stiffness, whereby progressive waves through the intercooler pipe are reflected and then vibration transmitted through the intercooler pipe is reduced.

* * * * *